US008624998B2

(12) United States Patent
James et al.

(10) Patent No.: US 8,624,998 B2
(45) Date of Patent: Jan. 7, 2014

(54) CAMERA IMAGE SELECTION BASED ON DETECTED DEVICE MOVEMENT

(75) Inventors: Bryan James, Menlo Park, CA (US); Andrew Hodge, Palo Alto, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 12/479,470

(22) Filed: Jun. 5, 2009

(65) Prior Publication Data

US 2010/0309334 A1    Dec. 9, 2010

(51) Int. Cl.
*H04N 5/76*  (2006.01)
*H04N 5/225*  (2006.01)

(52) U.S. Cl.
USPC ............... 348/231.2; 348/340; 348/E5.024

(58) Field of Classification Search
USPC ................................. 348/231.2, 340, E5.024
See application file for complete search history.

(56) References Cited

U.S. PATENT DOCUMENTS

| | | | |
|---|---|---|---|
| 5,471,405 A | 11/1995 | Marsh | |
| 6,013,007 A | 1/2000 | Root et al. | |
| 6,032,108 A | 2/2000 | Seiple et al. | |
| 6,135,951 A | 10/2000 | Richardson et al. | |
| 6,357,147 B1 | 3/2002 | Darley et al. | |
| 6,373,481 B1 * | 4/2002 | Tan et al. | 715/788 |
| 6,463,385 B1 | 10/2002 | Fry | |
| 6,539,336 B1 | 3/2003 | Vock et al. | |
| 6,560,903 B1 | 5/2003 | Darley | |
| 6,582,342 B2 | 6/2003 | Kaufman | |
| 6,619,835 B2 | 9/2003 | Kita | |
| 6,716,139 B1 | 4/2004 | Hosseinzadeh-Dolkhani et al. | |
| 6,790,178 B1 | 9/2004 | Mault et al. | |
| 6,793,607 B2 | 9/2004 | Neil | |
| 6,898,550 B1 | 5/2005 | Blackadar et al. | |
| 7,030,735 B2 | 4/2006 | Chen | |
| 7,062,225 B2 | 6/2006 | White | |
| 7,171,331 B2 | 1/2007 | Vock et al. | |
| 7,174,227 B2 | 2/2007 | Kobayashi et al. | |
| 7,200,517 B2 | 4/2007 | Darley et al. | |
| 7,251,454 B2 | 7/2007 | White | |
| 7,278,966 B2 | 10/2007 | Hjelt et al. | |
| 7,292,867 B2 | 11/2007 | Werner et al. | |
| 7,454,002 B1 | 11/2008 | Gardner et al. | |
| 7,519,327 B2 | 4/2009 | White | |
| 7,596,249 B2 * | 9/2009 | Bacus et al. | 382/128 |
| 7,618,345 B2 | 11/2009 | Corbalis et al. | |
| 7,670,263 B2 | 3/2010 | Ellis et al. | |
| 7,856,176 B2 * | 12/2010 | Yoon et al. | 396/55 |

(Continued)

FOREIGN PATENT DOCUMENTS

JP    2006-140892    *  6/2006  ............... H04N 5/91
WO    02/093272        11/2002

*Primary Examiner* — Hung Lam
(74) *Attorney, Agent, or Firm* — Wong, Cabello, Lutsch, Rutherford & Brucculeri, LLP (57) ABSTRACT

Systems and methods are provided for selecting one or more of several images captured in sequence and stored in a buffer in response to receiving a user instruction to store a captured image. An electronic device can capture information describing the movement of the device at the time each of the several images was captured, such that each image can be associated with specific device movement information. The electronic device can then select the one of the captured and buffered images for which the movement information of the device satisfies particular criteria. This can ensure that the particular image stored is not blurry due to device movement at the time the image was captured.

10 Claims, 5 Drawing Sheets

(56) References Cited

U.S. PATENT DOCUMENTS

| | | |
|---|---|---|
| 2002/0077784 A1 | 6/2002 | Vock et al. |
| 2003/0097878 A1 | 5/2003 | Farringdon et al. |
| 2005/0172311 A1 | 8/2005 | Hjelt et al. |
| 2005/0259888 A1 | 11/2005 | Ozluturk |
| 2005/0280733 A1 | 12/2005 | Imaizumi |
| 2006/0098106 A1* | 5/2006 | Tanaka .................... 348/231.99 |
| 2006/0132623 A1* | 6/2006 | Nozaki et al. ............ 348/231.99 |
| 2007/0009244 A1* | 1/2007 | Takahashi ...................... 396/55 |
| 2007/0040805 A1 | 2/2007 | Mellot |
| 2007/0147814 A1* | 6/2007 | Nomura et al. .................. 396/55 |
| 2008/0187181 A1 | 8/2008 | Meadow et al. |
| 2008/0259170 A1* | 10/2008 | Hatanaka ................... 348/208.6 |
| 2008/0259176 A1 | 10/2008 | Tamaru |
| 2008/0266406 A1 | 10/2008 | McLeod et al. |
| 2008/0304816 A1* | 12/2008 | Ebato .............................. 396/53 |
| 2009/0073286 A1* | 3/2009 | Sugino et al. ............. 348/231.99 |
| 2009/0135264 A1* | 5/2009 | John .......................... 348/220.1 |
| 2009/0160959 A1* | 6/2009 | Watanabe et al. ........ 348/208.99 |
| 2010/0265357 A1* | 10/2010 | Liu et al. ................... 348/223.1 |
| 2010/0309335 A1 | 12/2010 | Brunner et al. |
| 2011/0181742 A1* | 7/2011 | Nozaki et al. ............. 348/208.4 |

\* cited by examiner

CAMERA IMAGE SELECTION BASED ON DETECTED DEVICE MOVEMENT

BACKGROUND OF THE INVENTION

This is directed to capturing images using a lens of an electronic device, and selecting one of the captured images to store in memory. In particular, this is directed to capturing a sequence of images within a time period (e.g., within 1 or 2 seconds), and selecting an image from the sequence based on detected movements of the electronic device.

Many electronic devices include the ability to capture images. In particular, many cellular telephones, personal assistants, and other portable electronic devices have integrated some or all of the functionality of cameras. Using a lens, the electronic devices can capture light and store images of the user's environment or of people or objects of interest to the user. Because of inherent processing limitations, lens limitations, previewing limitations, and other limitations of lens embedded in electronic devices, users may experience a lag between the time when the users provide an instruction to capture an image and when the device actually captures and stores an image. For example, an electronic device may be subject to an inherent lag as the device switches from a preview mode in which the lens resolution is low (e.g., and requires less power) to an image capture mode having a higher resolution.

During the lag time, a user may shake or unintentionally move or tilt the electronic device, which may cause the image actually captured to be blurry or out of focus. In some cases, the act of pressing a button, touch screen, or other input interface of the electronic device can cause the electronic device, and thus the camera lens, to shake. Typical solutions to the device shake can include image stabilization or post-image capture sharpening and processing. In electronic devices that have smaller sensors however, image stabilization may not be possible. In addition, electronic devices with limited graphics processing capabilities or limited power may not be able to perform post-processing on an image in a resource efficient manner.

SUMMARY OF THE INVENTION

This is directed to systems and methods for capturing several images in sequence in response to receiving a user instruction to store a captured image. In particular, this is directed to comparing detected movement data associated with each of the several images in the sequence, and selecting the image associated with suitably low movement data.

In some embodiments, an electronic device can include a lens for capturing images of an environment, and a preview interface such as a viewfinder or a display providing an indication of the image captured by the camera lens at a particular time. The electronic device can include a physical or virtual input interface (e.g., a physical button, or a selectable option displayed on a display) that a user can select to direct the lens to store a captured image (e.g., take a photograph). When the user provides the instruction (e.g., presses a button), the electronic device can move slightly due to the force applied by the user on the device. In some cases, the electronic device may have a lag between the time the user provides the instruction and the time the device actually records a captured image, during which time a user may not hold the device perfectly immobile (e.g., the device can move relative to the initial position when the user provided the instruction). In other cases, the lens may require light to be captured for an extended period during which a user can inadvertently move the device (e.g., in low light conditions). This movement in the device can cause the lens to capture images that are not sharp or that are blurry or out of focus.

The device can measure or quantify the device movement using any suitable approach. In some embodiments, the electronic device can include a motion sensing component, such as one or more accelerometers providing outputs characterizing the device movement. The electronic device can receive measurements of device movement at any suitable time. For example, the motion sensing component can detect device movements at regular intervals. As another example, the motion sensing component can detect movements in response to a particular electronic device operation or function being enabled (e.g., detect motion when a camera mode is enabled). The detected motion sensing component output can be time stamped, such that a particular output is associated with particular inputs or information detected by sensors at the same time.

To ensure that an image is not blurry, the electronic device can continuously buffer images captured by the lens. The buffer can have any suitable length, including for example a buffer large enough to hold 10, 20 or 50 images. In some embodiments, the buffer length may vary based on user inputs. For example, a buffer may have an initial length of 10 images that expands to 20 images in response to receiving a user instruction to store a captured image. As each image is captured by the lens and stored in the buffer, the motion sensing component can provide an output depicting the device movement at the time the image is captured. Thus, each image in the buffer can be associated with motion information describing the movement of the electronic device at the time the image was captured.

In response to receiving a user instruction to store an image captured by a lens, the electronic device can mark the particular image in the buffer that corresponds to the moment at which the instruction was received. In addition, the electronic device can continue to store captured images in the buffer, up to a predetermined maximum buffer length (e.g., store 10, 15 or 20 additional images). The buffer can then include a series of images captured before and after the instruction was received. To select a picture that will not be blurry, the electronic device can analyze the motion sensing information associated with each of the images in the buffer, and identify the one or more images for which the motion sensing information is less than a maximum threshold or satisfies other criteria. The electronic device can then select one of the one or more images, and store the selected one or more images in memory. In some embodiments, the electronic device can present the one or more images to the user for selection.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to systems and methods for selecting one of several images captured by an electronic device lens in response to receiving a user instruction to store a captured image. In particular, this is directed to associating a series of sequentially captured images with information describing the motion of the electronic device at the time each image was captured. Other approaches for selecting images are described in commonly assigned U.S. Patent Application Publication No. 2010/0309335, entitled "Image Capturing Device Having Continuous Image Capture," filed Jun. 5, 2009, which is incorporated by reference herein in its entirety.

An electronic device can be operative to capture images of a user's environment. For example, an electronic device can include an optical or digital lens operative to capture light reflected from the user's environment. The electronic device may be operative to store particular images captured by the lens for playback (e.g., to print or to send electronically for others to view). The electronic device can store images at any suitable time, including for example in response to receiving a user instruction (e.g., in response to a user providing an input using an input interface), after a delay (e.g., in a timer mode), or automatically (e.g., at particular moments in time or when the electronic device detects movement). In some cases, however, a user may move as the device captures an image. This may cause images to be blurry, or otherwise lack definition.

The electronic device movement can be measured and quantified using any suitable approach. In some embodiments, the electronic device can include a motion detection or motion sensing component for detecting and measuring motion of the device. Such components can include, for example, accelerometers and gyroscopes, or other sensors for detecting linear and rotational acceleration. The motion sensing component can operate at any suitable time, and detect device movement at any suitable rate or frequency. In some embodiments, the frequency at which the motion sensing component detects device movement can be related to a frame rate or image capture rate of the lens.

To reduce the effect of unintentional movement or shaking of the device on captured images, the electronic device can continuously store sequentially captured images in a buffer when in an image capture (e.g., camera) mode. The image buffer can include any suitable number of images, and can in some embodiments have a varying length. For example, the image buffer can initially store 5, 10 or 20 consecutive images, where images are captured and buffered at a preset rate (e.g., 6 or 10 images per second). As the image buffer is filled with captured images, the electronic device can receive motion information from the motion sensing component at rates substantially corresponding to the rate at which captured images are buffered. This can allow the electronic device to associate the motion information and image that are detected and captured, respectively, at the same time. Thus each of the buffered images can be associated with motion information describing the particular movement of the device at the time the buffered image was captured.

In response to receiving a user instruction to store a captured image, the electronic device can save the captured images stored in the buffer just prior to receiving the user instruction, and continue to buffer additional images captured after receiving the user instruction. Any suitable number of images can be stored in the buffer, including a different number of images in the portions of the buffer corresponding to before and after the instruction was received. The electronic device can in addition associate movement information provided by the motion sensing component with each of the images stored in the buffer.

The electronic device can use any suitable approach for selecting one or more of the images stored in the buffer to store in memory. In some embodiments, the electronic device can compare the movement information associated with each of the buffered images, and select the image with the least movement information. In some embodiments, the electronic device can instead or in addition select one or more images for which the movement information is less than a maximum threshold. If several images satisfy the threshold requirement, the electronic device can select an image that is closest in time to the moment when the user instruction was received. Any other suitable approach can be used to select an image based on the movement information.

In some embodiments, the electronic device can augment the criteria for selecting a buffered image using additional information or attributes of each image. For example, the electronic device can analyze the composition, color palette or distribution, noise or other artifacts, or other attributes of each image to select one of the buffered images. As another example, the electronic device can select an image based on the presence, absence, or characteristics of a specific object or face in a picture (e.g., select the picture that has the most faces). In some embodiments, the electronic device can provide a preliminary filter and display a reduced number of images from which the user may select.

Figure 1:
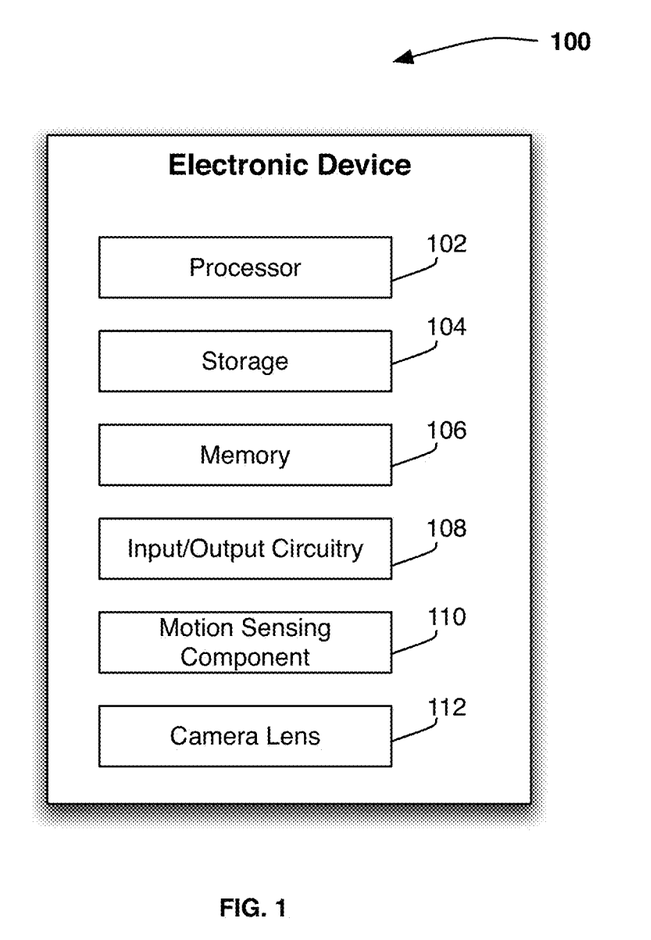
FIG. 1 is a schematic view of an illustrative electronic device for capturing images in accordance with one embodiment of the invention.

FIG. 1 is a schematic view of an illustrative electronic device for changing the display of information based on device movement in accordance with one embodiment of the invention. Electronic device 100 can include any suitable type of electronic device having a lens. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a camera, or any other portable electronic device capable of being moved by the user. The electronic device can include or be coupled to positioning circuitry to determine the current position of the electronic device.

Electronic device 100 can include a processor or control circuitry 102, storage 104, memory 106 input/output circuitry 108, motion sensing component 110, and camera lens 112 as typically found in an electronic device of the type of electronic device 100. In some embodiments, one or more of electronic device components 100 can be combined or omitted (e.g., combine storage 104 and memory 106), or electronic device 100 can include other components not combined or included in those shown in FIG. 1 (e.g., communications circuitry, motion detection or sensing components, or positioning circuitry), or several instances of the components shown in FIG. 1. For the sake of simplicity, only one of each of the components is shown in FIG. 1.

Motion sensing component 110 may be operative to detect movements of electronic device 100. For example, a motion sensor can be operative to detect a user's movements of electronic device 100 and thus determine a change in orientation or movement along a path of the device. In some embodiments, a motion sensor can include one or more three-axes acceleration motion sensors (e.g., an accelerometer) operative to detect linear acceleration in three directions (i.e., the x or left/right direction, the y or up/down direction, and the z or forward/backward direction). As another example, a motion sensor can include one or more two-axis acceleration motion sensors which can be operative to detect linear acceleration only along each of x or left/right and y or up/down directions (or any other pair of directions). In some embodiments, a motion sensor can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

Camera lens 112 can include any suitable lens operative to capture images or video of the electronic device environment. For example, the electronic device can include an optical or digital lens for capturing light reflected from the user's environment. The captured light can be recorded as individual distinct images, or as consecutive video frames of a recording (e.g., several video frames constituting a primary frame and subsequent frames indicating the difference between the primary frame and the subsequent frames). The control circuitry may associate different metadata with the recorded images, including for example positioning information, device movement information, a time code, a device identifier, or any other suitable metadata. As used in this application, the term camera lens will be understood to mean a lens for capturing light from a device environment, or a lens and appropriate circuitry for converting captured light into an image that can be previewed or stored by the device.

In some embodiments, electronic device 100 can include a bus operative to provide a data transfer path for transferring data to, from, or between control processor 102, storage 104, memory 106, input/output circuitry 108, motion sensing component 110, lens 112, and any other component included in the electronic device.

Figure 2A:
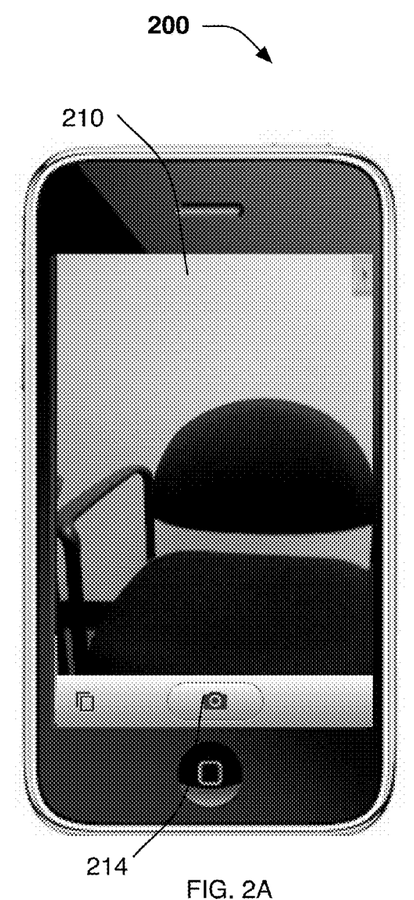
FIGS. 2A and B are schematic views of an illustrative electronic device in accordance with one embodiment of the invention.
Figure 2B:
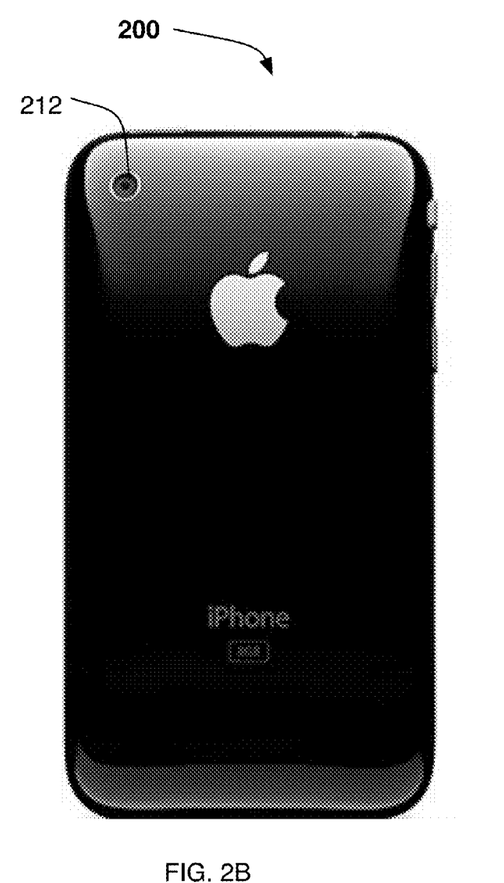

FIGS. 2A and B are schematic views of an illustrative electronic device in accordance with one embodiment of the invention. Electronic device 200 can include some or all of the features of electronic device 100 (FIG. 1). In particular, electronic device 200 can include display 210 and camera lens 212 extending from the device. When a camera mode is enabled, the electronic device can provide a preview of the image captured by lens 212 on display 210. The display can include option 214, which the user can select to store the captured image (e.g., take the photograph).

In the absence of an instruction to store a captured image, the electronic device can store images captured by the lens using any suitable approach. In some embodiments, the captured images can be passed directly to display circuitry for previewing. Once a more recent image is captured by the lens, prior images can be discarded and released from memory. Alternatively, the electronic device can temporarily or permanently store several captured images, for example in a buffer. The buffer can have any suitable length or size, including, for example, a length defined by an amount of memory (e.g., 5 MB), a number of images stored (e.g., 10 images), a duration during which images are captured (e.g., images captured by the lens during 1 second), or any other length. In response to capturing an image, the electronic device can pass the image to display circuitry for the preview display, and place the image in buffer. As new images are captured, the new images can be displayed and stored in the buffer, replacing the oldest captured image in the buffer when the buffer is full.

Figure 3:
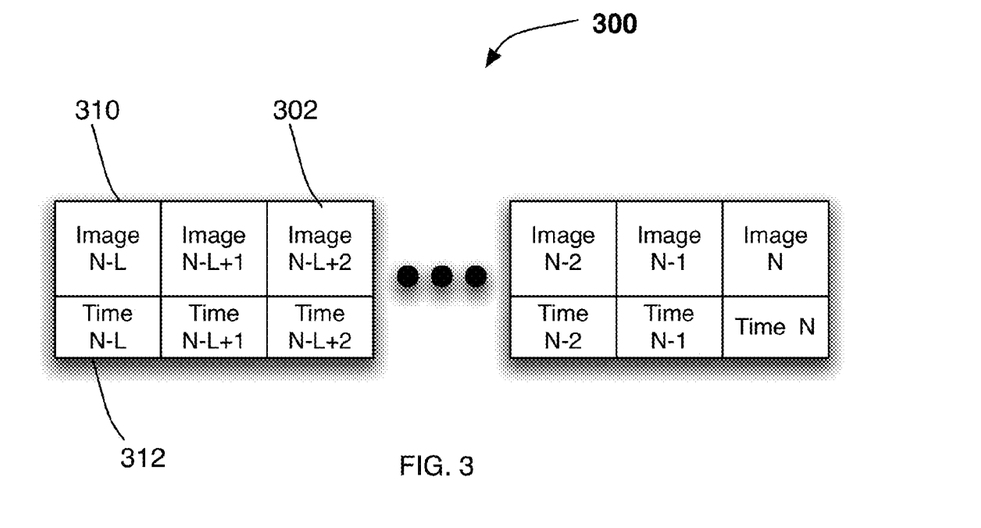
FIG. 3 is a schematic view of an illustrative image buffer in accordance with one embodiment of the invention.

Each image in the buffer can be time-stamped to determine the exact time at which the image was captured. Alternatively, the buffer can be defined such that a known duration exists between adjacent buffered images (e.g., images are buffered at different rates). This can allow the electronic device to determine timing information for each stored image relative to the most recently captured image (e.g., each image was captured 1/10 second before the following image). FIG. 3 is a schematic view of an illustrative image buffer in accordance with one embodiment of the invention. Buffer 300 can include several elements 302 for storing captured images and related information. For example, each element 302 can include captured image 310 and related time stamp 312. Some or all of the consecutive image captured by the lens can be stored in buffer 300. For example, buffer 300 can include every consecutively captured image. As another example, buffer 300 can include a subset of the captured images. The electronic device can select the subset using any suitable approach, including for example based on a predetermined interval between images (e.g., buffer every fourth captured image, or buffer an image every 500 ms), or based on a detected environmental condition (e.g., buffer images more closely in time in low light conditions, or in response to detecting substantial device movement).

Time stamp 312 can provide the absolute or relative timing information for the image 310 of the corresponding buffer element 302. For example, time stamp 312 can define the absolute or system time at which the corresponding image was captured. As another example, time stamp 312 can define a duration between the current buffer element and another buffer element of buffer 300 (e.g., the duration relative to the next or previous buffer element 302). In some embodiments, time stamp 312 can include a value that changes as additional images are placed in buffer 300 (e.g., if time stamp 312 defines timing information relative to the first or last buffer element 302 of buffer 300). In some embodiments, time stamp 312 can be used to associate particular images 310 with other time or image-specific data, such as movement data detected by a motion-sensing component. Time stamp 312 can then not specifically provide timing information, but instead provide a pointer or other reference information for associating the data with the image (e.g., time stamp 312 points to specific elements of a buffer of movement information populated by the output of a motion sensing component or include the movement information provided by the motion sensing component).

When a user provides an instruction to capture an image, the electronic device can lag before an image is actually captured and stored. During this delay, a user can unintentionally move or shake the device. In addition, the act of pressing a button, touching a screen, or otherwise providing an input using the input interface of the device can case can cause the user to shake or move the device. When the device, and thus the lens moves, the captured image can be blurry or lack definition. To avoid storing a blurry image, the electronic device can instead select one of the images buffered around the time the instruction to store the image was received.

In response to receiving an instruction to store an image from a user (e.g., in response to receiving an instruction to take a photograph), the electronic device can save the buffered images that were captured shortly before and/or after the instruction was received. For example, the electronic device can save some or all of the buffered images when an instruction is received, and continue to buffer a predetermined number of images captured after the instruction was received. Based on the buffer length, the electronic device can retain some or all of the more recently captured images prior to receiving the instruction. For example, the electronic device can retain images captured within a predetermined duration from the instruction receipt (e.g., retain all images captured within 2 seconds from the instruction), or a particular number of images (e.g., retain 10 prior images).

The electronic device can retain images captured after receiving the instruction using any suitable approach. For example, the electronic device can identify the oldest buffered image to retain, and replace all older images with images captured after receiving the instruction in the same buffer. As another example, the electronic device can define a second buffer for capturing images received after the receiving the user instruction. The electronic device can store images captured after receiving the instruction at any suitable rate, including for example at a rate different from the rate used for images captured prior to receiving the instruction. The second buffer can have any suitable length measured in any suitable manner (e.g., in any of the manners discussed above), including for example the same length as the buffer of images captured before receiving the instruction, or a different length (e.g., having more images).

The electronic device can select any of the buffered images for storage in response to receiving a user instruction to store a captured image. In some embodiments, the electronic device can select an image to capture based on data describing the movement of the electronic device, so as to select an image that was captured while the device was substantially motionless. Using a motion sensing component, the electronic device can measure the device movement at different moments in time. The electronic device can process the motion sensing component output using any suitable approach. In some embodiments, the electronic device can determine the linear or rotational acceleration to which the device is subject based on the motion sensing component output (e.g., an accelerometer output). Alternatively, or in addition, the electronic device can process the output to determine a different measurement for the motion, such as integrating acceleration information over several motion sensing component outputs to determine velocity or displacement measurements for the device. The selected movement information can then be analyzed to determine when the device movement is satisfactory.

The electronic device can retain past motions sensing component outputs or movement quantities in a buffer, where each particular output is associated with a time stamp. The time stamps can then be used to determine which of the buffered images to associate with the different movement information. For example, the electronic device can retrieve the time stamps associated with each buffered image (e.g., time stamps 312, FIG. 3), and identify the particular movement information measured or processed at a time corresponding to the time stamp, and associated the image with the identified movement information. In some embodiments, the identified movement information can be specifically linked to the images in buffer 300 (FIG. 3), added to buffer elements 302 of buffer 300, incorporated as metadata in each image, or associated with captured images using any other suitable approach.

The electronic device can analyze the movement information (e.g., the processed or raw output of the motion sensing component associated with each image) of each buffered image to select an image that both includes what the user wanted to capture from the environment, but that also is not blurry due to device movement as the image was captured. The electronic device can use any suitable criteria for determining whether movement information is suitable or adequate. For example, the electronic device can select the image in the buffer that is associated with the lowest movement information. As another example, the electronic device can identify all images that are associated with movement information that is less than a maximum threshold, and select the one of the identified images that is closest to when the instruction to store an image was received (e.g., closest in time or in number of buffered images from the image associated with the time at which the instruction was received). In some embodiments, the maximum threshold can change for different sets of captured images. For example, the maximum threshold can be selected based on conditions of the environment (e.g., light conditions), attributes of the captured image (e.g., color palette, F-stop, aperture), lens settings (e.g., optical or digital zoom), or any other external conditions or settings that can be set or detected by the device. In some embodiments, the electronic device can give preference to images captured after the instruction to store an image was received (e.g., when people are more likely to be posing properly).

Figure 4:
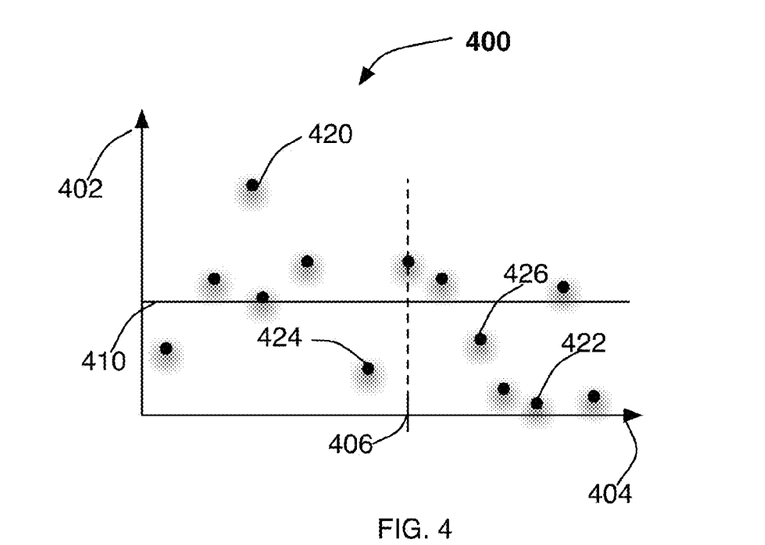
FIG. 4 is a schematic diagram illustrating how to select a particular buffered image in response to receiving a corresponding instruction in accordance with one embodiment of the invention.

FIG. 4 is a schematic diagram illustrating how to select a particular buffered image in response to receiving a corresponding instruction in accordance with one embodiment of the invention. Diagram 400 includes movement axis 402 and time axis 404. Each image stored in the buffer for which movement information is available is depicted by a mark 420. The maximum threshold for movement information is depicted by line 410, and the instant of time at which an instruction to store an image was received is depicted by line 406. As can be seen in diagram 400, of all of the images stored in the buffer, only a subset are associated with movement information that is less than the maximum threshold. The electronic device can then disregard all images having movement information that exceeds the threshold, and select one of the images represented by a mark 420 below line 410. In some embodiments, the electronic device can select the image having the lowest movement information (e.g., the image associated with mark 422). As another example, the electronic device can select the image having movement information below the threshold and that is the closest in time to the time at which the instruction was received (e.g., the image associated with mark 424). As still another example, the electronic device can select the image having movement information below the threshold and that is the closest in time to and after the time at which the instruction was received (e.g., the image associated with mark 426).

In some embodiments, a combination of approaches can be used to select a particular image. For example, the electronic device can display several images selected using different approaches to the user, and allow the user to select one or more of the images to store. As another example, the electronic device can analyze characteristics of the images themselves to select a particular image. Suitable characteristics can include, for example, the composition of the image, lighting characteristics, a color palette, specific objects or faces detected in the image, zoom level, aperture, F-stop, or other characteristics of the captured image.

Figure 5:
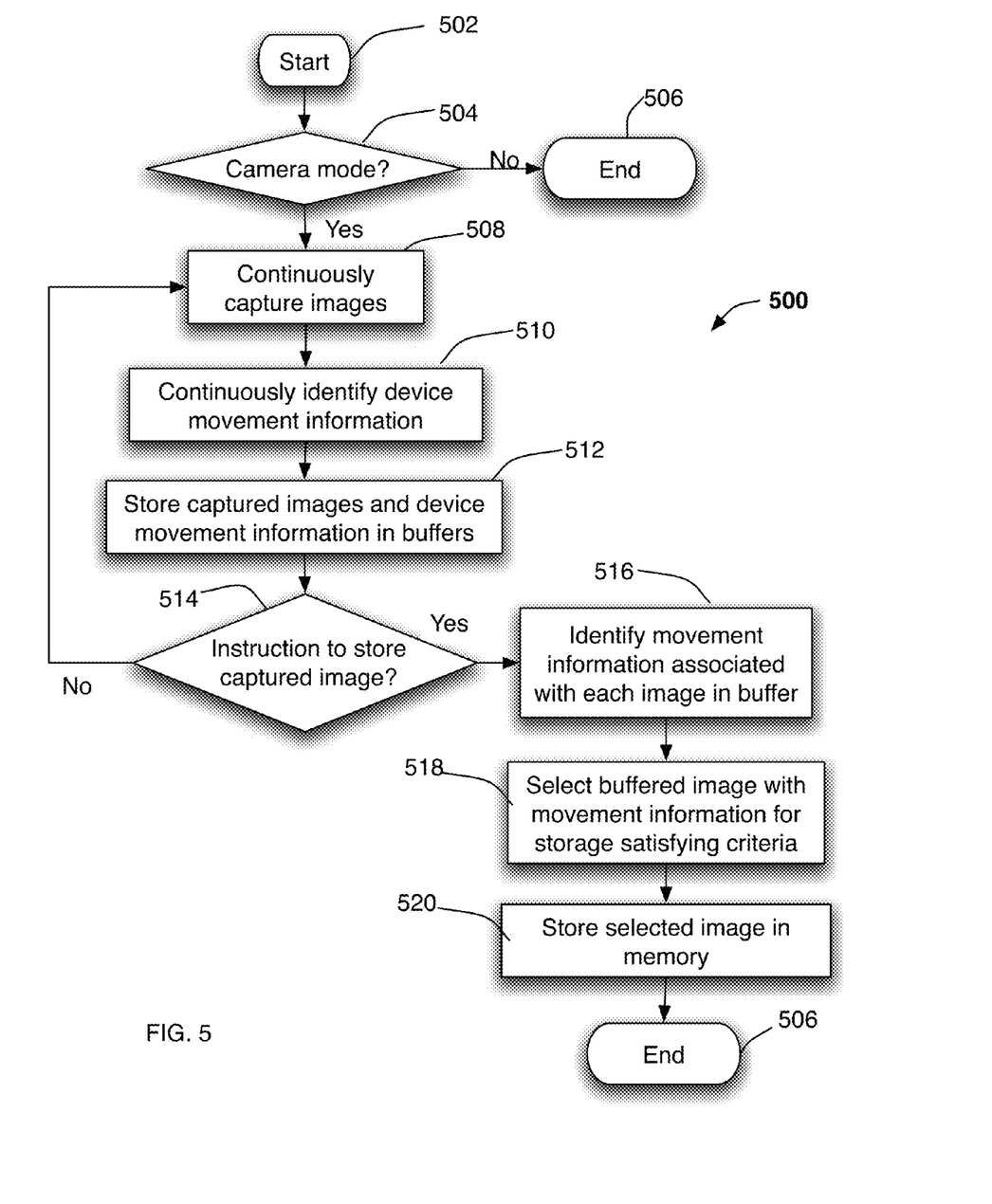
FIG. 5 is a flowchart of an illustrative process for selecting an image from a buffer of stored images based on detected movement data in accordance with one embodiment of the invention.

The following flowcharts illustrate steps of various processes used in different embodiments of the invention. FIG. 5 is a flowchart of an illustrative process for selecting an image from a buffer of stored images based on detected movement data in accordance with one embodiment of the invention. Process 500 can begin at step 502. At step 504, the electronic device can determine whether a camera mode is enabled. For example, the electronic device can determine whether the user provided an instruction to operate a camera application or turn on a camera lens. If the electronic device determines that the camera mode is not enabled, process 500 can move to step 506 and end. If, at step 504, the electronic device instead determines that the camera mode is enabled, process 500 can move to step 508.

At step 508, the electronic device can continuously capture images using a camera lens. For example, the electronic device can enable a camera lens to capture light reflected from the user's environment. The electronic device can display the captured images in sequence on a preview screen for the user, and temporarily store some or all of the captured images in memory. At step 510, the electronic device can continuously identify device movement information for the device. For example, the electronic device can receive the successive output of a motion sensing component and process the output, if necessary, to define comparable quantities describing the device movement. In some embodiments, the electronic device can perform integration operations on acceleration data to define velocity or displacement quantities describing the device movement. At step 512, the electronic device can store the captured images and the device movement information in buffers. For example, the electronic device can store captured images in a first buffer, and movement information in a second buffer. As another example, both images and movement information can be stored in the same buffer. In some embodiments, device movement information describing the device movement at a particular moment in time can be associated with the image captured at that same moment in time (e.g., using pointers, metadata, buffer elements, or any other suitable approach).

At step 514, the electronic device can determine whether an instruction to store a captured image was received. For example, the electronic device can determine whether a user provided an input using an input interface to store an image (e.g., take a photograph). If the electronic device determines that no such instruction was provided, process 500 can return to step 508 and continue to capture images. If, at step 514, the electronic device instead determines that an instruction to store a captured image was received, process 500 can move to step 516. At step 516, the electronic device can identify the movement information associated with each image in the image buffer. For example, the electronic device can retrieve a movement information buffer associated with the image buffer. As another example, the electronic device can extract movement information from specific images in the image buffer, or from data stored in the image buffer. In some embodiments, the electronic device can continue to store captured images and identified movement information for a duration after having received the instruction at step 514.

At step 518, the electronic device can select a buffered image that is associated with movement information that satisfies predetermined criteria. The predetermined criteria can include any criteria suitable for selecting images captured when the device movement was small, including for example the image associated with the smallest identified movement, an image associated with movement information that is less than a maximum threshold, an image associated with appropriate movement information and close in time to when the instruction was received, or any other suitable criteria. In some embodiments, the criteria can be supplemented by analysis of characteristics of each captured image, or by providing a subset of captured images from which the user can select (e.g., if several captured images satisfy the initial predetermined criteria). In some embodiments, several images can be selected. At step 520, the selected image can be stored in memory. For example, the electronic device can add the one or more selected images to a photo library. Process 500 can then end at step 506.

Figure 6:
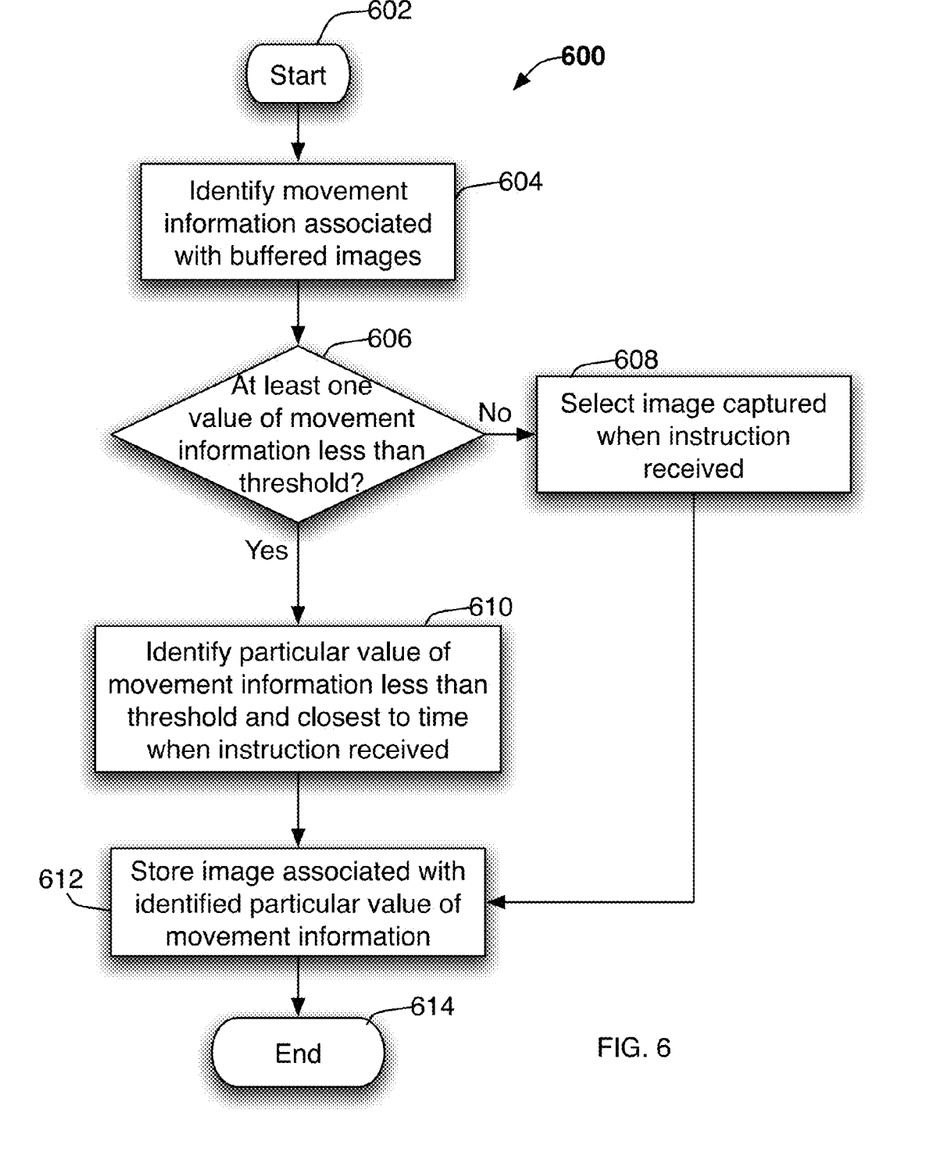
FIG. 6 is a flowchart of an illustrative process for applying predetermined criteria to select from several captured images in accordance with one embodiment of the invention.

FIG. 6 is a flowchart of an illustrative process for applying predetermined criteria to select from several captured images in response to an instruction to store a captured image in accordance with one embodiment of the invention. Process 600 begins at step 602. At step 604, the electronic device can identify movement information associated with buffered images. For example, the electronic device can determine associations of buffered movement information with buffered images captured by a device lens. The electronic device can use any suitable approach to determine the associations, including for example using on time stamps associated with both the images and movement information. At step 606, the electronic device can determine whether at least one value of the identified movement information is less than a predetermined threshold. For example, the electronic device can compare the values quantifying the identified movement with a threshold and determine whether the values are less than the threshold value. If the electronic device determines that none of the values of the identified movement information is less than the threshold, process 600 can move to step 608. At step 608, the electronic device can select and store the image captured at the time the instruction was received. Process 600 can then move to step 612.

If, at step 606, the electronic device instead determines that at least one value of identified movement information is less than the threshold, process 600 can move to step 610. At step 610, the electronic device can identify a particular value of movement information that is less than the threshold and that is also closest in time to the time at which the instruction was received. For example, the electronic device can determine the particular value of movement information indicating that the device was sufficiently stable and that is as close as possible to the time at which the instruction was received. At step 612, the electronic device can store the image associated with the identified particular value of movement information. By this process, the selected image can be the image captured when the device was sufficiently stable and close in time to when the instruction was received. Process 600 can then end at step 614.

The above described embodiments of the invention are presented for purposes of illustration and not of limitation, and the present invention is limited only by the claims which follow.

What is claimed is:

1. A method for storing an image captured by a lens of an electronic device, comprising:
   capturing a plurality of images using the lens, each of the images having a corresponding capture time;
   storing the captured images in a buffer;
   detecting movement information describing movement of the electronic device using a motion sensing component;
   associating each image in the buffer with movement information detected at a time corresponding to the image's capture time, wherein the act of associating further comprises:
     storing the detected movement information as movement information values in a second buffer;
     associating a first time stamp with each of the captured images in the buffer;
     associating a second time stamp with each of the movement information values stored in the second buffer; and associating captured images and movement information values based, at least in part, on a relationship between the first time stamps and the second time stamps;

receiving an instruction to store a captured image;

identifying one or more images in the buffer having associated movement information that satisfies a movement threshold; and selecting one of the identified one or more images for storage, wherein the act of selecting one of the identified one or more images for storage comprises selecting an image from the identified one or more images having a corresponding capture time that is closest in time to the time that the instruction to store the captured image was received.

2. The method of claim 1, wherein the act of storing the captured images in a buffer further comprises:

determining that the buffer is full; and replacing an oldest captured image in the buffer with a newest image captured by the lens.

3. The method of claim 1, wherein the act of associating each image in the buffer with movement information further comprises embedding as metadata, for each captured image in the buffer, the movement information detected at the time corresponding to the image's capture time.

4. The method of claim 1, wherein the act of detecting movement information describing movement of the electronic device using a motion sensing component comprises processing acceleration information from the motion sensing component to identify at least one of velocity and displacement information.

5. The method of claim 1, wherein the act of selecting one of the identified one or more images for storage further comprises determining whether each of the identified one or more images was captured before or after the instruction to store the captured image was received.

6. The method of claim 1, wherein a value of the movement threshold is selected based on at least one of: conditions of an environment in which the plurality of images are captured, attributes of the captured images, and lens settings.

7. An electronic device operative to capture and store images, comprising:

a lens operative to capture images;

a memory operative to store captured images in a buffer;

a motion sensing component operative to quantify movement of the electronic device; and a processor operative to execute instructions stored in the memory to cause the processor to:

direct the lens to sequentially capture images;

direct the motion sensing component to quantify device movement during a time period that the lens captures images;

direct the memory to store each of the sequentially captured images in the buffer, wherein the most recently captured images replace older captured images stored in the buffer when the buffer is full;

associate each image in the buffer with a quantified device movement value, wherein the instructions to associate further comprise instructions to:

store the quantified device movement values as movement information values in a second buffer;

associate a first time stamp with each of the captured images in the buffer;

associate a second time stamp with each of the movement information values stored in the second buffer; and associate captured images and movement information values based, at least in part, on a relationship between the first time stamps and the second time stamps;

receive an instruction to store a captured image;

identify one or more images in the buffer having an associated device movement value that satisfies a movement threshold, wherein the movement threshold is selected based on at least one of:

environmental conditions, attributes of the sequentially captured images, and lens settings; and select one of the identified one or more images for storage in the memory, wherein the instructions to cause the processor to select one of the identified one or more images for storage in the memory comprise instructions to select an image from the identified one or more images having a corresponding capture time that is closest in time to the time that the instruction to store the captured image was received.

8. The system of claim 7, wherein the images stored in the buffer are captured both before and after the instruction to store a captured image is received.

9. The electronic device of claim 7, further comprising instructions stored in the memory to cause the processor to determine a buffer size based on at least one of:

an amount of memory available;

a number of captured images to store; and a duration from the current time.

10. Non-transitory computer readable media for storing an image captured by a lens of an electronic device, comprising computer-readable instructions recorded thereon to cause a processor to:

capture a plurality of images using the lens;

store the captured images in a first buffer;

detect movement information values describing movement of the electronic device using a motion sensing component;

store the detected movement information values in a second buffer;

associate each captured image in the first buffer with detected movement information values detected at a time the image was captured, wherein the instructions to associate further comprise instructions to:

associate a first time stamp with each of the captured images in the first buffer;

associate a second time stamp with each of the movement information values stored in the second buffer; and associate captured images and movement information values based, at least in part, on a relationship between the first time stamps and the second time stamps;

receive an instruction to store a captured image;

identify one or more images in the first buffer having associated movement information that satisfies a movement threshold; and select one of the identified one or more images, wherein the instructions to cause the processor to select one of the identified one or more images comprise instructions to select an image from the identified one or more images having a corresponding capture time that is closest in time to the time that the instruction to store the captured image was received.

* * * * *